March 30, 1965 E. G. REED, JR 3,175,489
AIR-DELIVERED ANTI-PERSONNEL MINE
Filed Nov. 27, 1962 4 Sheets-Sheet 1

INVENTOR
Edwin G. Reed, Jr.

BY Louis Sheldon
ATTORNEY

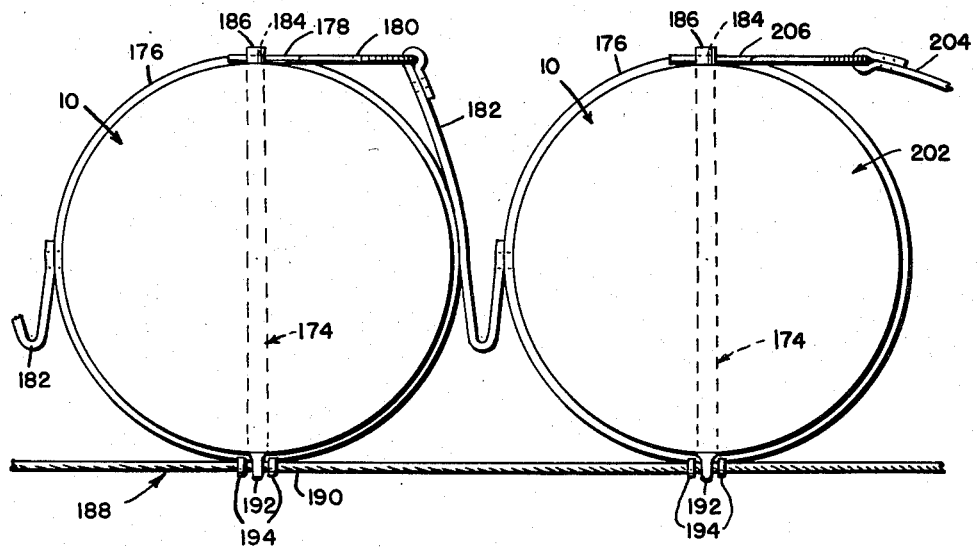
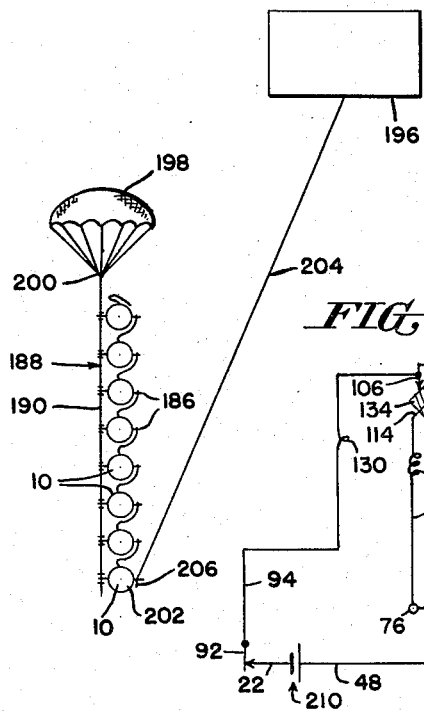
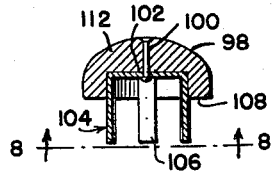
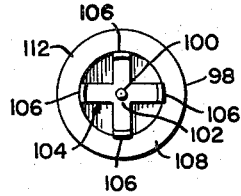
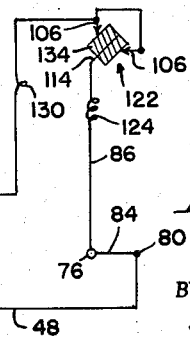

March 30, 1965 E. G. REED, JR 3,175,489
AIR-DELIVERED ANTI-PERSONNEL MINE
Filed Nov. 27, 1962 4 Sheets-Sheet 3

INVENTOR
Edwin G. Reed, Jr.

BY Louis Sheldon
ATTORNEY

March 30, 1965     E. G. REED, JR     3,175,489
AIR-DELIVERED ANTI-PERSONNEL MINE
Filed Nov. 27, 1962     4 Sheets-Sheet 4
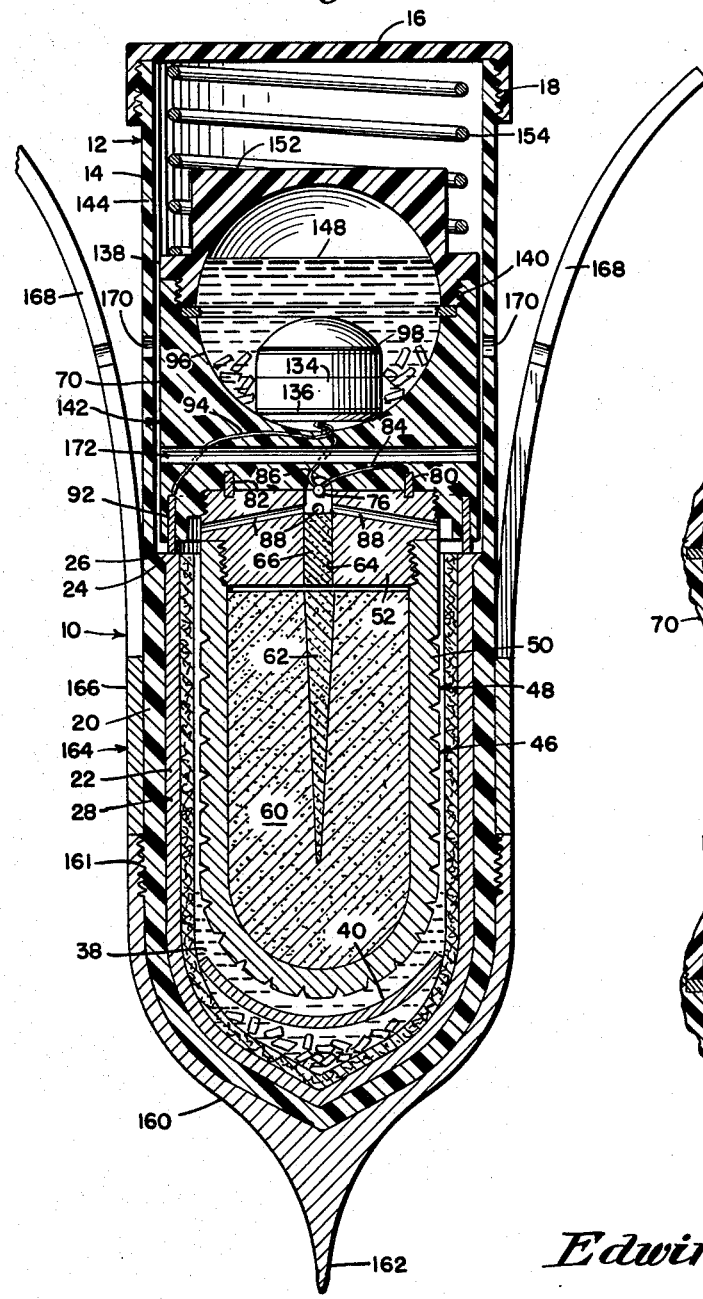
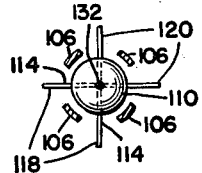
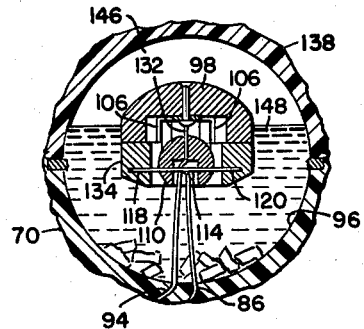
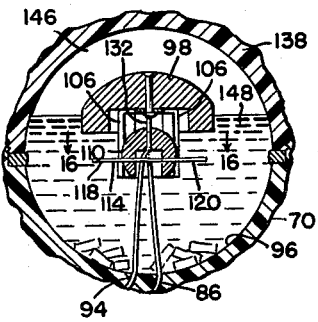
INVENTOR
Edwin G. Reed, Jr.
BY Louis Sheldon
ATTORNEY United States Patent Office 3,175,489
Patented Mar. 30, 1965

3,175,489
AIR-DELIVERED ANTI-PERSONNEL MINE
Edwin G. Reed, Jr., 18937 Nordheff St., Northridge, Calif.
Filed Nov. 27, 1962, Ser. No. 240,465
4 Claims. (Cl. 102—8)
(Granted under Title 35, U.S. Code (1952), sec. 266)

The invention described herein may be manufactured and used by and for the Government of the United States of America for governmental purposes without the payment of any royalty thereon or therefor.

This invention relates to anti-personnel mines and is concerned more particularly with an air-delivered anti-personnel land mine.

It is an object of the invention to provide an antipersonnel mine that can be delivered in large numbers by service aircraft without aircraft modification.

A further object is to provide an anti-personnel mine that can be made cheaply, in large numbers, without using scarce materials or requiring new production facilities.

Additional objects are to provide an anti-personnel mine that: can be delivered from any altitude; can be used in any terrain, including jungle areas; will not be activated until after impact with the ground; will have a lethal radius of at least about ten feet against unarmored, armed personnel; will rise about ten feet from impact before exploding, thereby substantially maximizing its lethal radius; will remain armed in place for at least three months; can be stored indefinitely without deterioration.

Further objects and advantages of the invention will appear as the description proceeds.

The invention will be better understood on reference to the following description and the accompanying drawing, wherein:

FIG. 3 is an elevational view showing how several of the mines are maintained in a string in an aircraft.

FIG. 4 is an elevational schematic view showing a parachute-supported string of mines.

FIG. 7 is a sectional view of a detail of the switch-and-float assembly.

FIG. 8 is an elevational view taken as indicated at 8—8 in FIG. 7.

FIG. 11 is similar to FIGS. 1 and 8 but shows the changed relation of parts resulting from impact of the mine with the ground.

FIG. 12 shows the circuitry completed pursuant to impact, but with the switch still unable to close.

FIG. 13 is similar to the upper part of FIG. 9 but shows the magnetic switch-and-float assembly afloat, with the switch still unable to close.

FIG. 15 is similar to FIG. 13 but with the magnetic switch able to close.

FIG. 16 is a sectional view taken at 16—16 in FIG. 15, showing only the magnetic switch.

Figure 1:
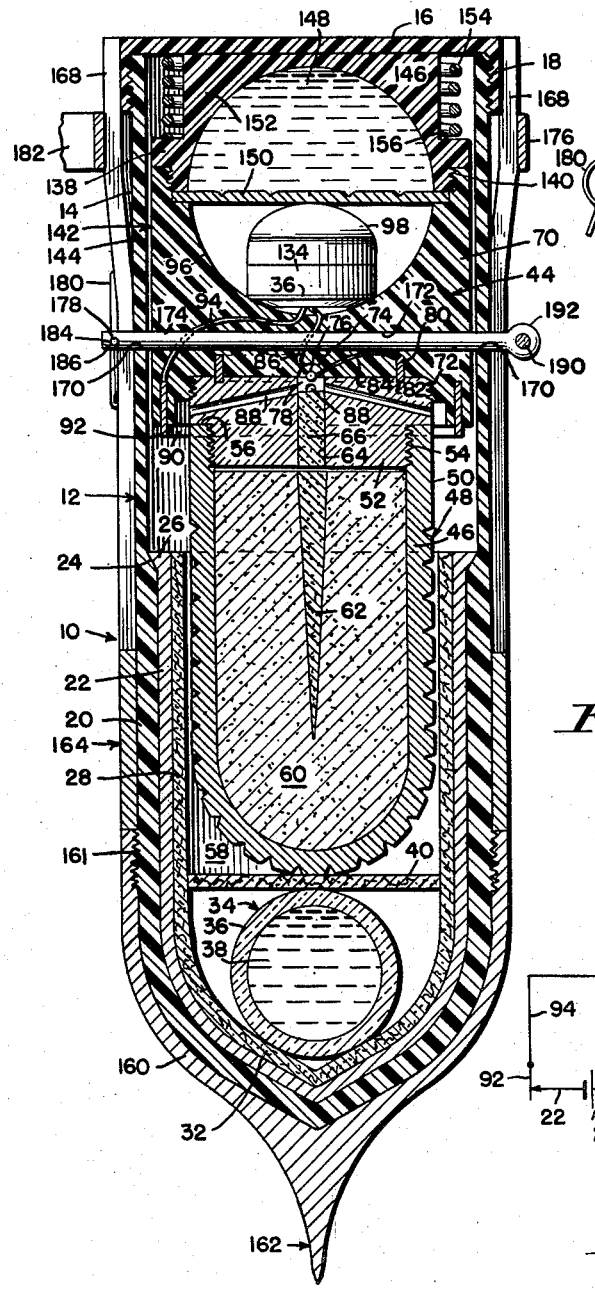
FIG. 1 is a longitudinal cross-sectional view of an anti-personnel land mine embodying features of the invention, at inception of free fall.

Referring now to the drawing, depicting an illustrative embodiment of the invention, there is shown at 10 (FIGS. 1 and 2) a mine as the parts thereof are arranged when the mine begins its free fall. The mine 10 includes a melamine formaldehyde resin or other suitable barrel or housing 12 comprising a cup-like tube 14 closed at the top by a cap 16 threaded at 18 thereto. The lower part 20 of the tube 14 is thickened inward and encases a cup-like liner 22 which is to function as an electrode of an electric cell, as will appear, and may be formed of carbon and manganese dioxide or other suitable electrode material. The top 24 of the thickened portion 20 provides a seat for the outwardly projecting rim 26 of the liner 22, and may be chamfered for that purpose. The liner 22 in turn has a protective cup-like liner 28 of blotting paper or other suitable porous material.

Seated on the bottom 32 of the protective liner 28 is a capsule 34 comprising a hollow frangible sphere 36 of glass or other suitable material containing an electrolyte 38, such as a solution of ammonium chloride and zinc chloride. A protective blotting paper or other suitable porous disc pad 40 overlies the sphere 36.

The mine 10 also includes a missile in the form of a plunger 44 having at its bottom a grenade 46 of reduced diameter. The grenade 46 comprises a zinc or other suitable shell 48 which is to function as the other electrode of the electric cell. The shell 48 comprises an externally serrated cup 50 and a cap 52 threaded at 54 into and seated on the rim 56 of the cup. The cup 50 projects down into the space 58 defined by the blotting paper 28 and 40, and contains a bursting charge 60 and a booster charge 62. The cap 52 has an axial bore 64 therethrough, filled below the top with a slow-burning type of solid rocket propellant 66.

The plunger 44 also includes a molded plastic block 70 of melamine formaldehyde resin or other suitable material externally threaded at 72 to the grenade cap 52 and having a bottom central recess 74 forming with the upper end of the cap's bore 64 a pocket in which an electrical igniter 76 is disposed in spaced relation, as indicated at 78, to the top of the propellant 66. A brass or other suitable metal ring 80 is cast in the part of the block 70 directly over the cap 52 and projects downward out of the block and is firmly seated in an annular groove 82 in the top of the cap. A wire 84 cast in the block 70 is connected to the ring 80. The wire 84 and a fine copper wire 86, insulated with melamine lacquer or other suitable material and also cast in the block 70, project into the recess 74 and are connected to and support the igniter 76. Vents 88 bored in the cap 52 establish communication between the space 78 and the annular space 90 exterior to the cap. A second brass or other suitable metal ring 92, cast in the lower outer peripheral portion of the block 70, projects downward therefrom and about and spaced from the grenade 46 and directly over the rim 26 of the liner 22. An insulated wire 94, like the wire 86, is cast in the block 70 and connected to the ring 92.

Figure 5:
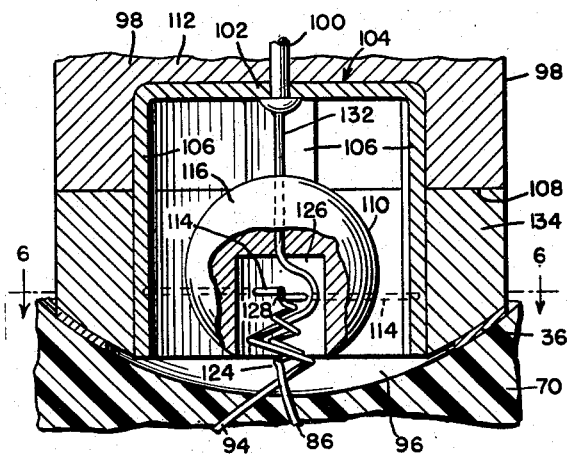
FIG. 5 is an enlarged view, partly in section and partly in elevation, of the magnetic switch-and-float assembly appearing in the upper part of FIG. 1, the switch being unable to close.
Figure 9:
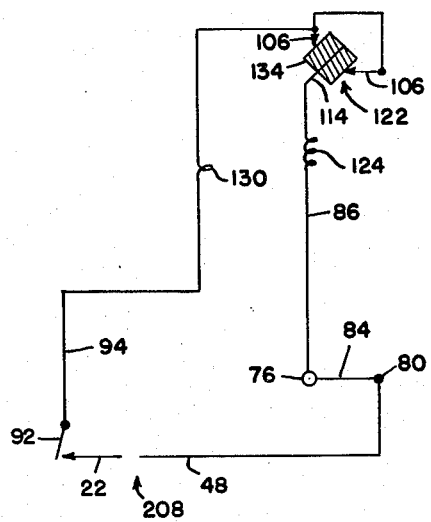
FIG. 9 is a diagram of the incomplete circuitry embodied in the mine before impact with the ground.
Figure 6:
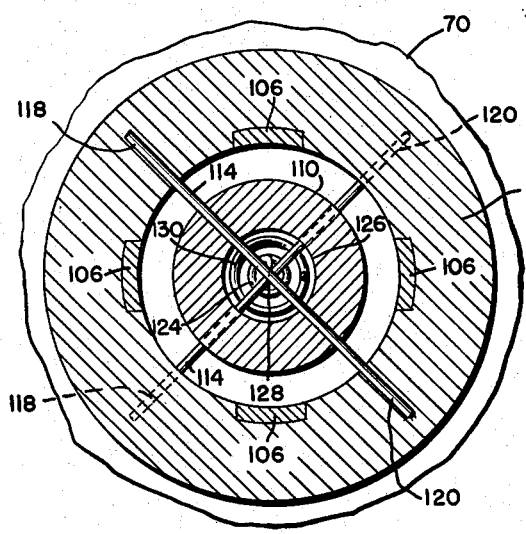
FIG. 6 is a plan sectional view taken as indicated at 6—6 in FIG. 5.

The block 70 is formed in its upper side with a hemispherical cavity 96 containing an inverted cup-like wood or other suitable float 98 in which is riveted at 100 the hub 102 of a brass or other suitable metal cruciform spider 104 (FIGS. 5, 7 and 8) whose legs 106 project downward beyond the rim 108 of the float. A smaller inverted cup-like wood or other suitable float 110 below and spaced from the base 112 of the float 98 is located within the confines of and spaced from the spider 104. Electrically connected crossed magnetic needles 114 (see also FIGS. 5 and 6) pass through and are securely held by the float 110. The needles 114 are spaced below the base 116 of the float 110, and the needle poles 118 and 120 project into circumferentially spaced and alternating relation to the spider legs 106 and form therewith an open magnetic switch 122 (FIG. 9) which, as will appear, cannot close until after an interval of time following impact of the mine 10 with the ground. The wire 86 projects into the cavity 96, passes upward in coiled form, as at 124 (FIGS. 5 and 6), into the interior 126 of the float 110, and is electrically connected to the needle juncture 128. The wire 94 projects into the cavity 96, passes upward in coiled form, as at 130, into the interior 126 of the float 110 and about the coil 124, is secured axially in the base 116 of said float, and has an upper end portion 132 electrically connected to the spider hub 102. The spider legs 106 and needle poles 118 and 120 are cast in an acetone-soluble sleeve 124 (shown also schematically in FIG. 9) extending upward to the rim 108 of the float 98, the bottom of the sleeve being secured by an acetone-soluble adhesive 136 to the bottom of the cavity 96. It is manifest that the sleeve 134 prevents closing of the switch 122.

A complemental molded plastic block 138 of melamine formaldehyde resin or other suitable material is threaded at 140 to the upper rim of the block 70 and forms therewith a piston 142 having a sliding fit in the unthickened portion 144 of the tube 14. The block 138 has a hemispherical cavity 146 complemental to the cavity 96 and containing a solution of acetone 148 and partitioned from the cavity 96 by a serrated glass or other suitable frangible disc 150 held in place by the blocks 70 and 138. The block 138 has an upper end portion 152 of reduced diameter to accommodate thereabout a coil spring 154 and provide an annular edge 156 between which and the top of the housing cap 16 the spring is compressed.

The bottom of the housing 12 is closed and converges downward, and is encased in a brass or other suitable rugged cup 160 threaded at 161 to the housing and having a spike-like bottom 162.

A plastic or other suitable sleeve 164 about the housing 12 has at its bottom a collar 166 secured as by plastic or other suitable adhesive to the housing above the rim of the cup 160 and is cut above the collar to provide upwardly extending longitudinal fingers or ribbons 168.

The housing 12 and block 70 are respectively formed with diametral holes 170 and 172 for accommodating a removable safety locking pin 174 to prevent drop of the plunger 44 in the housing 12 prior to free fall of the mine 10, as will appear. The fingers 168 flanking the ends of the pin 174 are notched (not shown) to clear the ends of the pin.

Prior to free fall of the mine 10, the fingers 168 are held against the housing 12 by a removable fabric belt 176 about the upper end of the housing. A steel cotter 178 is connected as by a ring 180 (FIG. 2) to an extension 182 of the belt 176 and snugly passes through a hole 184 in the tip 186 of the safety pin 174 of the next one of a series of mines 10. The mines 10 are maintained in a string 188 by means of a stranded steel cable 190 (FIGS. 3 and 4) passing through the eyes 192 of the pins 174 of the several mines, the cable having a pair of steel stops 194 straddling each eye. The string of mines is loaded into a steel box 196 designed for the dispensing of the mines from an aircraft (not shown) by means of a parachute 198 connected to the end 200 of the cable 190, the box being placed at a hatch of the aircraft.

Inasmuch as there will be no mine-carried cotter 178 for the pin 174 in the last mine, indicated at 202 (FIGS. 3 and 4) of the string 188, there is anchored to the box 196 a cord or ribbon 204 having at its free end a cotter 206 received in the hole 184 in the pin tip 186 of said last mine.

When the parachute 198 is released from the aircraft and enters the slipstream, the parachute pulls the cable 190 and thus the string 188 of mines 10 out of the box 196 and into the slipstream. The last mine 202 in its descent tenses the ribbon 204, and the safety pin end 186 of the last mine is then pulled free of the cotter 206, whereupon said mine, with its belt 176, slips from its safety pin 174, and falls. As the mine 202 falls, it pulls its cotter 178 out of the safety pin end 186 of the next mine 10 in the string 188, and thereupon said next mine slips free of its safety pin 174 and falls with its belt 176. Thus, in a chain reaction all of the mines are successively released for fall.

Figure 10:
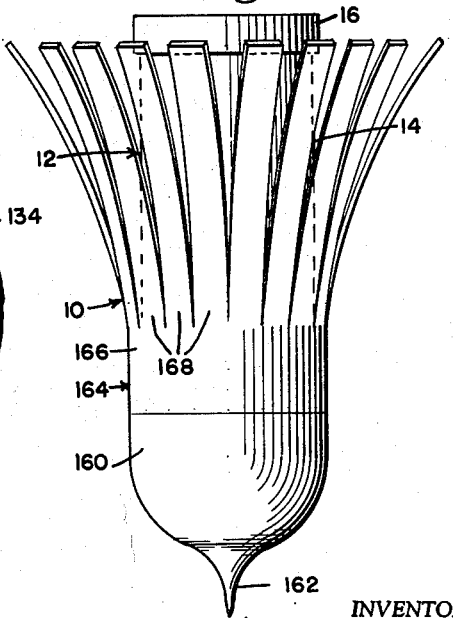
FIG. 10 is an elevational view of the mine in free fall.

Each belt 176 loosely girds the respective mine, so that, as each mine is thus released and starts its fall, its belt is blown off by the rush of air, whereupon the fingers 168 spring out and collectively assume the flared formation shown in FIG. 10 and thus operate to stabilize the attitude of the free-falling mine with its spike 162 lowermost.

Figure 2:
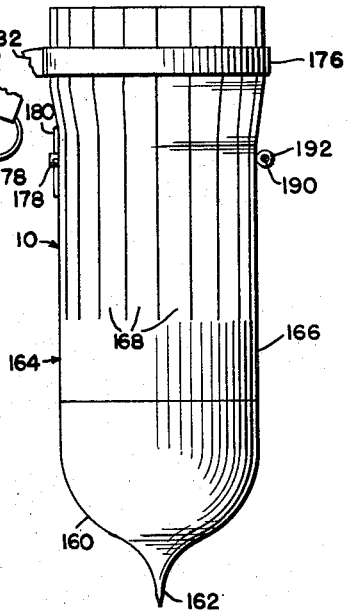
FIG. 2 is an elevational view of the same.

With removal of the safety pin 174, the spring 154 is released to the extent of depressing the plunger 44 slightly so that the plunger is supported by the capsule 34, as is apparent from FIG. 1.

Prior to impact of the mine 10 with the ground, the electric circuit of the mine is incomplete, as indicated at 208 (FIG. 7), lacking as it does a source of electric energy.

The force of the impact of the mine with the ground causes the mine to become imbedded in the ground and causes the plunger 44 to plunge in the housing 12 and hence the grenade 46 to shatter the frangible container 36 (FIG. 11), freeing the electrolyte 38, which readily seeps through the blotting paper 28 into contact with the electrode 22 and through the blotting paper 40 into contact with the electrode 50, thereby creating a battery cell 210 (FIG. 12). The plunge of the plunger 44 is stopped by engagement of the brass ring 92 with the rim 26 of the electrode 22 (FIGS. 11 and 12), and the plunger is held in this position by the spring 154.

Figures 14, 17:
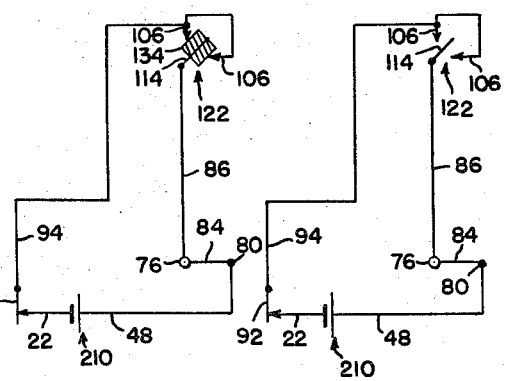
FIG. 14 shows the circuitry corresponding to FIG. 13.
FIG. 17 shows the circuitry with the magnetic switch able to close.

Also at the impact, the partition 150 shatters, allowing the acetone solution 148 to descend into the cavity 96. The acetone solution 148 then dissolves the adhesive 136 and thus frees the sleeve 134 from the bottom of the cavity 96. Thereupon the slack in the wires 86 and 94, afforded by their respective coils 124 and 130, permits the rigid switch-and-float assembly to ascend in the acetone 148 to a level (FIG. 13) at which the assembly is moored by the now unslacked wire 94, with the sleeve 134 immersed in the acetone, and the needles 114 horizontal. FIG. 14 is like FIG. 12 except for the absence of the coils 124 and 130, as the coils are unslacked at this stage. On dissolution of the adhesive 136, the assembly, if not then magnetically azimuthally oriented by the magnetic field local to the mine, will so orient itself. During and after the orientation, the acetone 148 continues to dissolve the sleeve 134. When the sleeve 134 is dissolved, the float 98 is moored to the float 110 by the wire portion 132 (FIG. 15), with the needle poles 118 and 120 still in their original spaced relation to the respective spider legs 106 so long as the magnetic field local to the mine is undisturbed, the switch now being able to close (FIGS. 16 and 17).

With the mine 10 in the condition just described, then, when the magnetic field local to the mine is disturbed, as by a rifle or other steel object which may be borne by a soldier, the magnetic needles 114 rotate and of course cause the small float 110 also to rotate. Due to the inertia of the large float 98 and attached spider 104 and the readiness with which the fine wire portion 132 twists, the large float and spider remain substantially stationary, with the result that the needle poles 118 and 120 are arrested by the spider legs 106 and thereby close the switch 122 (FIG. 17), completing a circuit to the igniter 76. The burning igniter 76 ignites the slow burning rocket propellant powder 66, the gases of combustion escaping through the vents 88 to the annular space 90 (FIG. 11). The buildup in gas pressure in the space 90 acts on the piston 142 to propel the plunger 44 upward, the plunger shattering the plastic housing cap 16 and lifting the plunger to a height of about ten feet. Substantially at the zenith of the flight of the plunger 44, the burning powder 66 ignites the booster charge 62 which in turn ignites the bursting charge 60, exploding the grenade 46, which thus can have an injurious or lethal effect on personnel in a large region.

The solvent 148 and the substances 134 and 136 soluble therein may be of any suitable character. If the solvent 148 is a ketone, of which acetone is an example, the substances 134 and 136 may be an acrylic resin, such as a methyl methacrylate polymer, of which Lucite is an example. The solvent 148 is provided in sufficient quantity to assure prompt dissolution of the substances 134 and 136.

It is apparent that the invention may be practiced with the use of non-scare materials, and will accomplish the objects specifically set forth in and implicit from the foregoing.

Obviously many modifications and variations of the invention are possible in the light of the above teachings. It is therefore to be understood that within the scope of the appended claims the invention may be practiced otherwise than as specifically described.

I claim:
1. In an air-delivered anti-personnel land mine,
   (a) a barrel having means for maintaining the barrel in a substantially upright attitude in free fall;
   (b) the barrel having a spike-like bottom to plant the barrel substantially upright in the earth;
   (c) an unarmed grenade in the barrel; and
   (d) means responsive to planting of the barrel in the earth for arming the grenade;
   (e) said means including magnetically controlled means operative in response to a disturbance of the local magnetic field for firing the grenade upward out of the planted barrel and into the air and exploding the grenade while the grenade is in the air.

2. In an anti-personnel land mine,
   (a) a barrel to be dispensed from the air;
   (b) means for maintaining the barrel substantially upright during free fall;
   (c) the barrel having a sharply-pointed bottom to enable the barrel to be embedded substantially upright in the earth;
   (d) an unarmed grenade in the barrel;
   (e) a liquid electrolyte capsule in the barrel below the grenade;
   (f) the capsule being breakable by the grenade on impact of the barrel with the earth to free the electrolyte;
   (g) a member adjacent the capsule and spaced from the grenade;
   (h) the member and the grenade casing being respectively formed of materials which, in contact with the electrolyte, will serve as electrodes of an electric cell including the electrolyte;
   (i) the grenade casing and the member being simultaneously contactible by the freed electrolyte; and
   (j) means including the cell for arming the grenade.

3. The structure of claim 2,
   (k) the barrel being frangible and closed,
   (l) said means including a magnetic switch responsive to disturbance of the local magnetic field for firing the armed grenade upward through the barrel and into the air and exploding the grenade while the grenade is in the air.

4. The structure of claim 2,
   (k) a first contact carried by and insulated from the grenade and disposed over and spaced from said member while the capsule is intact;
   (l) means operative on the breaking of the capsule for holding the contact in engagement with said member;
   (m) an electrical insulator body connected to the grenade and having first and second compartments;
   (n) a frangible partition hermetically separating the compartments and being breakable on impact of the barrel with the earth;
   (o) a non-electrolytic solution in only the first compartment and capable of gravitating into the second compartment on the breaking of the partition;
   (p) a lower float in the second compartment;
   (q) a magnetic needle secured to the lower float;
   (r) an upper float in the second compartment;
   (s) a second contact secured to the upper float and spaced from the needle poles and forming with the needle a switch;
   (t) the body, partition and floats being insoluble in the solution;
   (u) a first wire anchored in the body and electrically connecting the needle to the first contact and having a slack portion in the second compartment;
   (v) an electrically activated igniter electrically connected to the grenade casing;
   (w) a second wire anchored to the body and electrically connected to the igniter and having a slack portion in the second compartment;
   (x) an electrical insulator soluble in the solution;
   (y) the second contact, needle, and slack portions being cast in the insulator;
   (z) a third wire secured to and extending between the floats and electrically connected to the second contact and to the slack portion of the second wire; and
   (aa) an adhesive soluble in the solution and adhesively securing the insulator to the second compartment;
   (bb) the floats, second contact, needle, insulator, slack portions and third wire being floatable as a unit in the solution when the partition is broken;
   (cc) the wires being substantially non-resistant to torsion when twisted less than 180°;

whereby, on breaking of the partition and dissolution of the adhesive, the unit will float in the solution and assume a position in which the needle is oriented north and south, and, on dissolution of the insulator, the first wire will moor the lower float, the third wire will moor the upper float to the lower float, the needle poles will remain in spaced relation to the second contact until the magnetic field local to the mine is disturbed, and engagement of one of the poles with the contact will close an electric circuit which will activate the igniter.

References Cited by the Examiner
UNITED STATES PATENTS

| | | | |
|---|---|---|---|
| 1,239,134 | 9/17 | Steel | 102—7.2 X |
| 1,300,333 | 4/19 | Berry | 102—5 |
| 1,318,926 | 10/19 | Settle | 102—4 |
| 2,044,819 | 6/36 | Taylor | 102—4 |
| 2,062,674 | 12/36 | Pirwitz | 200—84 |
| 2,245,125 | 6/41 | Chambers | 200—84 |
| 2,374,179 | 4/45 | Delalande | 102—8 |
| 2,376,227 | 5/45 | Brown | 102—7.2 X |
| 2,397,137 | 3/46 | Glennon et al. | 102—18 X |
| 2,399,242 | 4/46 | Metcalfe | 102—64 X |
| 2,412,742 | 12/46 | Muffly | 102—18 X |
| 2,440,702 | 5/48 | Short | 102—8 |
| 2,453,715 | 11/48 | Liljigren | 102—8 |
| 2,682,567 | 6/54 | Porter | 102—70.2 |
| 2,690,122 | 9/54 | Darnall et al. | 102—7.2 |
| 2,826,990 | 3/59 | Gross | 102—8 |
| 2,931,848 | 4/60 | Burrell | 102—70.2 X |
| 2,972,946 | 2/61 | Poulter | 102—7.2 |

BENJAMIN A. BORCHELT, *Primary Examiner.*
SAMUEL W. ENGLE, *Examiner.*